United States Patent [19]

Haydt, Jr.

[11] 4,298,323
[45] Nov. 3, 1981

[54] APPARATUS FOR MOLDING LAMINATED FOAM-BODY PANELS

[75] Inventor: Leo A. Haydt, Jr., Mountaintop, Pa.

[73] Assignee: Precision Tool & Machine, Inc., Mountaintop, Pa.

[21] Appl. No.: 126,784

[22] Filed: Mar. 3, 1980

[51] Int. Cl.³ .................. B29D 27/04; B32B 5/20; B32B 31/06

[52] U.S. Cl. .................. 425/162; 249/78; 249/83; 249/105; 249/170; 249/171; 264/46.5; 425/120; 425/123; 425/127; 425/450.1; 425/451.9; 425/817 R; 425/DIG. 13

[58] Field of Search .............. 425/120, 123, 450.1, 425/817 R, 127, 451.9, 162, DIG. 13; 264/DIG. 83, 46.5; 249/78, 83, 88, 171, 172, 105

[56] References Cited

U.S. PATENT DOCUMENTS

| | | |
|---|---|---|
| 3,161,911 | 12/1964 | Mathews . |
| 3,310,616 | 3/1967 | Beary ............................ 425/120 X |
| 3,752,437 | 8/1973 | Saidla .......................... 425/450.1 X |
| 3,813,463 | 5/1974 | Conger ........................ 425/817 R X |
| 3,881,856 | 5/1975 | Fougea . |
| 4,012,186 | 3/1977 | Ramazzotti et al. ............ 425/123 |
| 4,036,923 | 7/1977 | Saidla .......................... 425/817 R X |

Primary Examiner—Philip Anderson
Attorney, Agent, or Firm—Steele, Gould & Fried

[57] ABSTRACT

Molding apparatus for laminated foam-body panels, comprising first and second walls defining a molding cavity therebetween, the first wall including means for heating the foam during molding and the second wall comprising hingeably mounted access doors, adjustable holding and shaping means for said panels, disposed within the cavity and at least two of which are perpendicularly adjacent, means for simultaneously positioning each of the holding and shaping means, first and second movable locking means for the holding and extrusion means and for the access doors respectively, the first locking means being automatically actuated in response to the positioning means, means for simultaneously actuating and disengaging the first and second locking means, and means for filling the cavity with unmolded foam material.

15 Claims, 14 Drawing Figures

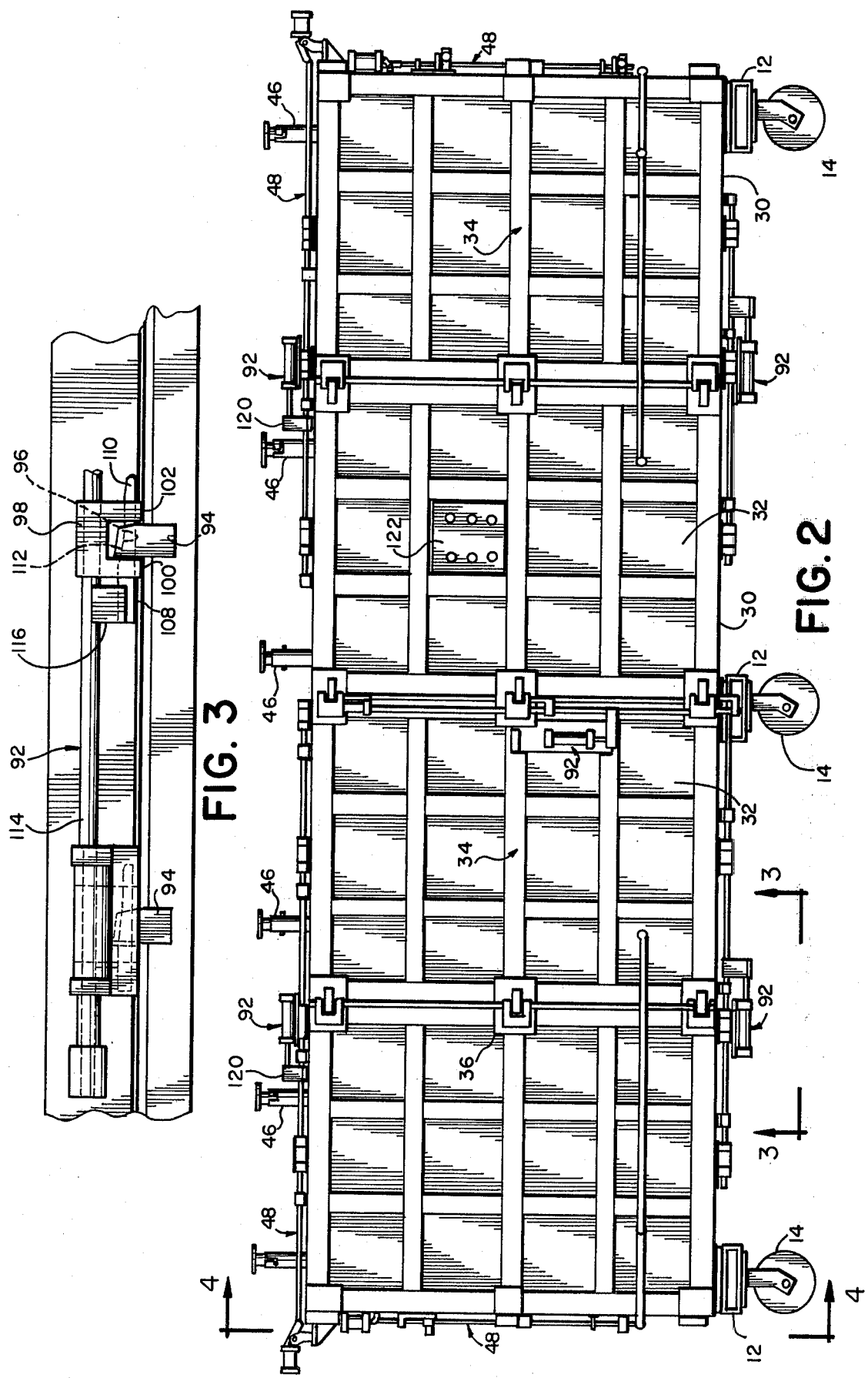

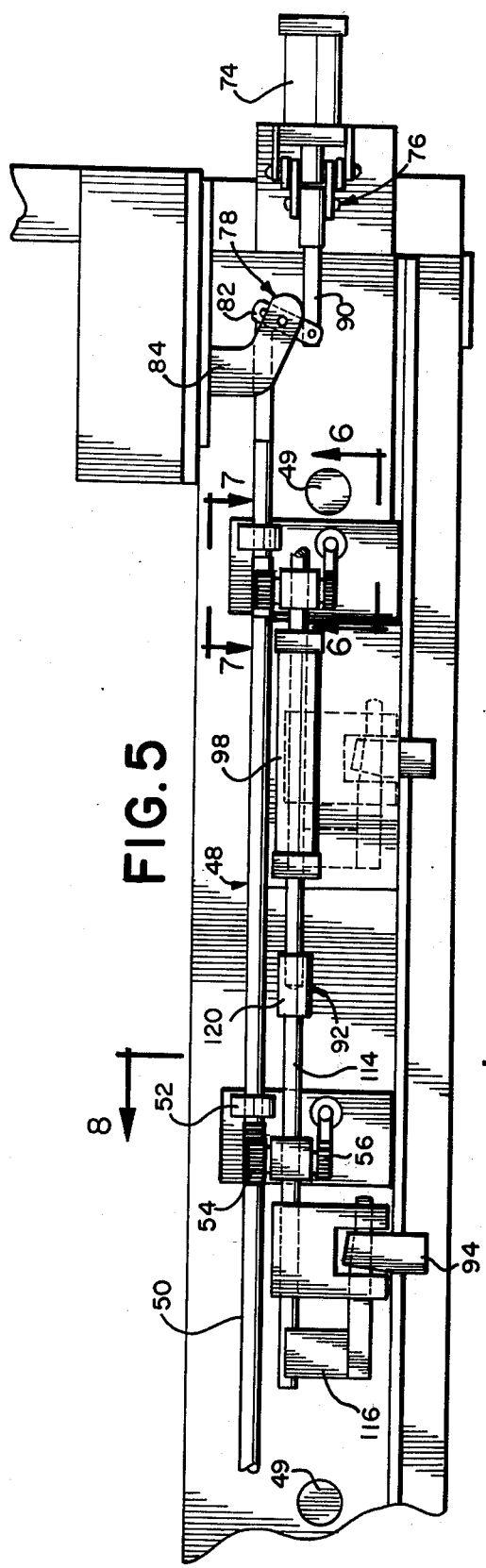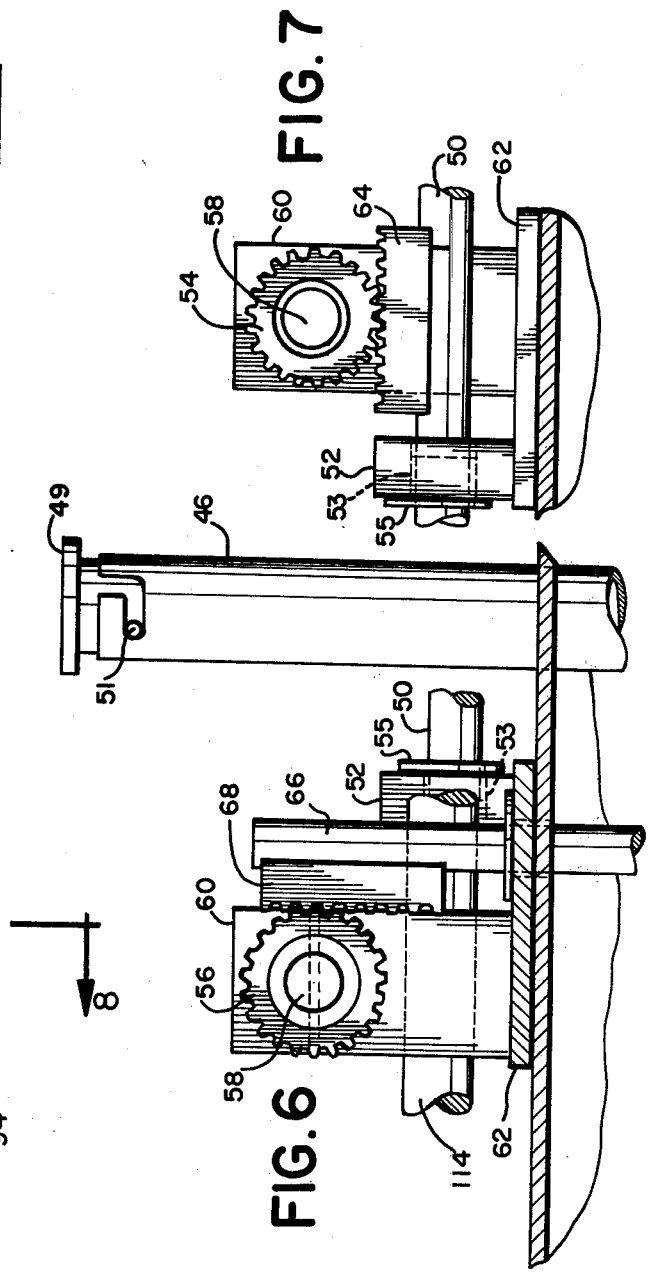

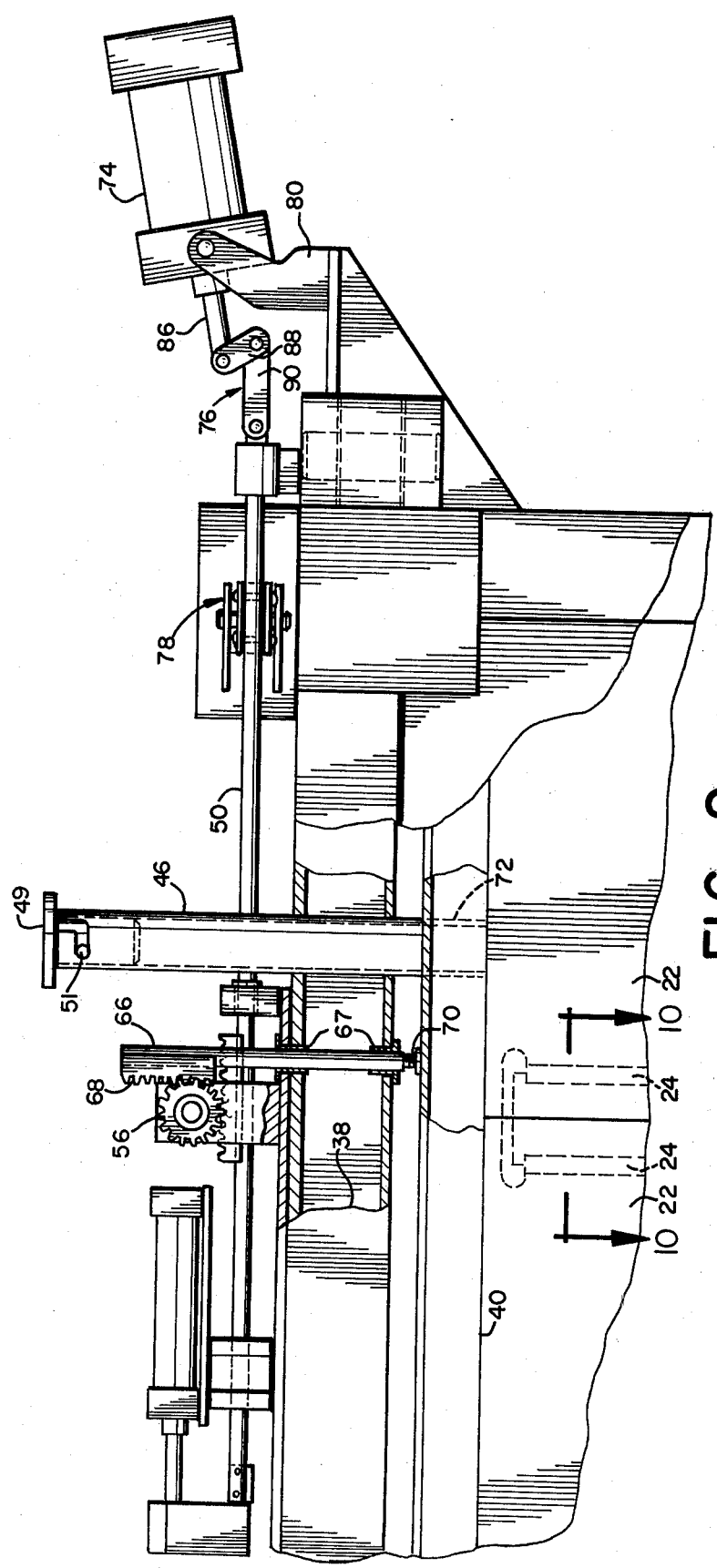

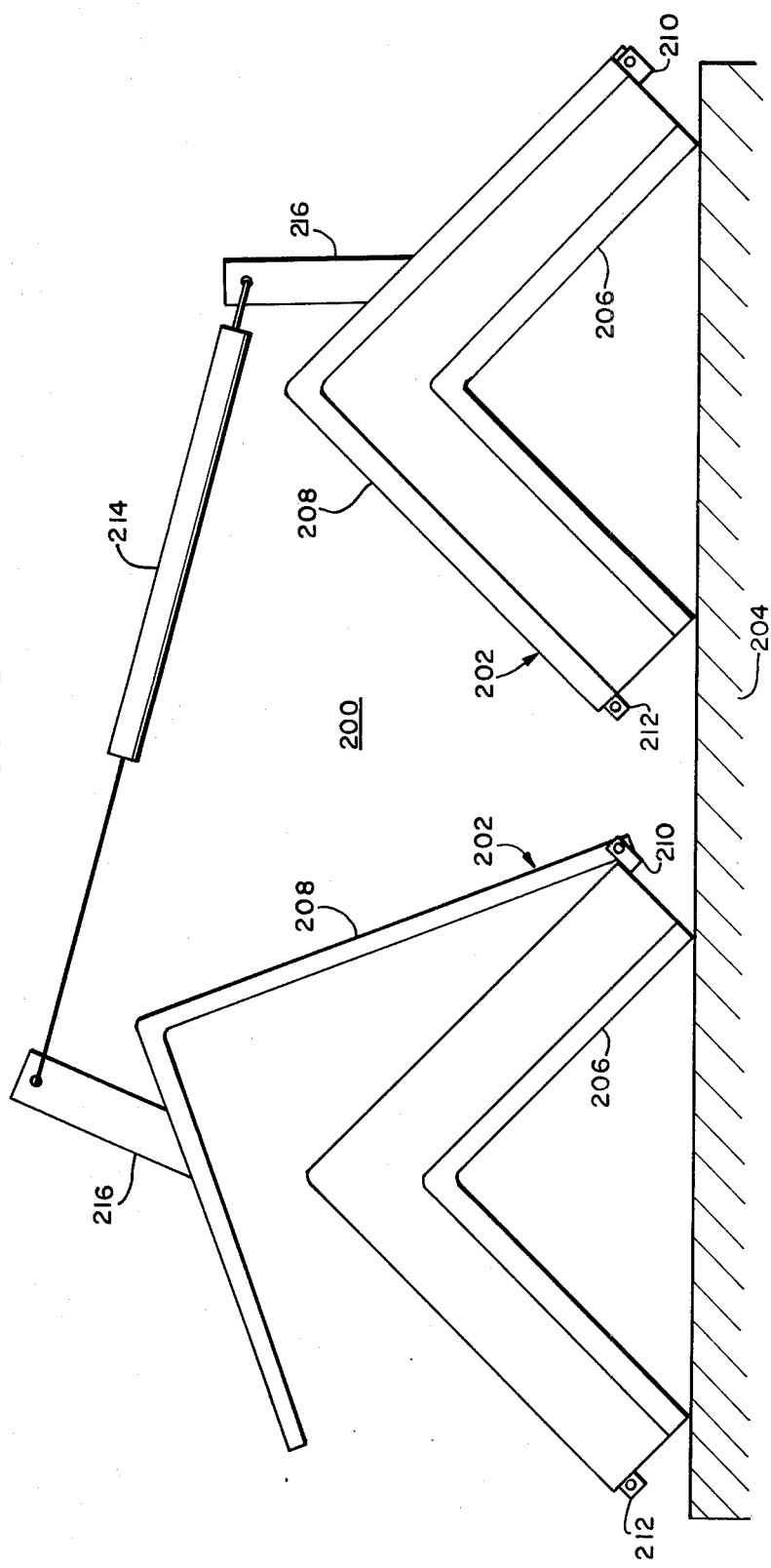

APPARATUS FOR MOLDING LAMINATED FOAM-BODY PANELS

BACKGROUND OF THE INVENTION

This invention relates to the field of molding large laminated foam-bodied panels, for use in insulated structures and the like, and in particular, to an apparatus for molding such panels which through novel and improved construction, greatly facilitates production of rich panels in a variety of sizes.

Until recently, foamed and foam-bodied panels were produced by a self-sustaining, exothermic chemical reaction caused by mixtures of the foam ingrediants. Since no special apparatus for heating the foam during molding was required, large size panels were made in knock-down forms constructed of plywood or the like, and relied on clamps and other reinforcing members for structural rigidity during molding. The forms were crude and worse, were very costly in terms of time of production.

Only recently, the federal government banned the production methods which rely upon the chemicals used in such exothermic reactions. It has therefore become necessary for the industry to provide new methods and apparatus for producing large, laminated or clad foam-bodied panels. Molding machines have been known for smaller items, but producing panels on the order of twelve to fifteen feet in length and four feet wide presents different problems.

Such problems might be summarized as the difficulty of providing an apparatus which is large enough and which is sturdy enough to provide a large flat sided pressurized molding cavity, and at the same time, which is easy to operate. Applicant has provided an apparatus which not only overcomes these difficulties, but which is portable, each being mountable on a wheeled or castored carriage, and which provides full access to the molding cavity, which can produce a variety of panel sizes, and which "locks up" in an automatic fashion.

Applicants invention is not only applicable to flat panels, but to corner-type panels as well.

SUMMARY OF THE INVENTION

It is an object of this invention to provide an apparatus for molding large, laminated form-bodied panels.

It is another object of this invention to provide an apparatus for molding large, laminated form-bodied panels having complete access to the molding cavity.

It is another object of this invention to provide a molding apparatus as described, capable of producing large panels in a variety of sizes and configurations.

It is a still further object of this invention to provide a molding apparatus as described, having means for heating the foam during molding.

It is yet another object of this invention to provide a molding apparatus as described, whereby the panels may be locked into a molding position by movable holding and shaping means.

It is yet another object of this invention to provide a molding apparatus as described, wherein one wall of the molding cavity comprises hingeably mounted access doors, which doors may be locked by a wedge-shaped locking member moved together with means for locking the holding and shaping means.

These and other objects of this invention are accomplished by a molding apparatus for laminated foam-body panels, comprising first and second walls defining a molding cavity therebetween, the first wall including means for heating the foam during molding and the second wall comprising hingeably mounted access doors, adjustable holding and shaping means for said panels, disposed within the cavity and at least two of which are perpendicularly adjacent, means for simultaneously positioning each of the holding and shaping means, first and second movable locking means for the holding and shaping means and for the access doors respectively, means for simultaneously actuating and disengaging the first and second locking means, and means for filling the cavity with unmolded foam material.

The first locking means comprises four panel-edge engaging members, supported by a plurality of structures, each structure being movable through a side of the cavity, each of the structures being movable by a rack and pinion assembly. The second locking means comprises a plurality of movable wedges, each wedge having a double inclined locking surface.

The actuating and disengaging means comprises at least one first locking bar member, having a plurality of racks, and pinions driven thereby, each of said locking bar member pinions being fast with one of said pinions of said first locking means, and at least one second locking bar member, each of said wedges being fast with said second locking bar member whereby movement of the locking bar members actuates and disengages said first and second locking means.

BRIEF DESCRIPTION OF THE DRAWINGS

For the purpose of illustrating the invention, there are shown in the drawings forms which are presently preferred; it being understood, however, that this invention is not limited to the precise arrangements and instrumentality shown.

FIG. 2 is a front elevation of FIG. 1;

FIG. 3 is a section view taken along the line 3—3 in FIG. 2;

FIG. 5 is a partial top elevation taken along the line 5—5 of FIG. 4;

FIG. 6 is a partial section view taken along the line 6—6 in FIG. 5;

FIG. 7 is a partial section view taken along the line 7—7 in FIG. 5;

FIG. 9 is a front elevation, partially cut away, and in enlarged scale, of the upper right hand portion of FIG. 2;

FIG. 10 is a partial section view taken along the line 10—10 in FIG. 9;

DETAILED DESCRIPTION OF THE PREFERRED EMBODIMENTS

Figure 1:
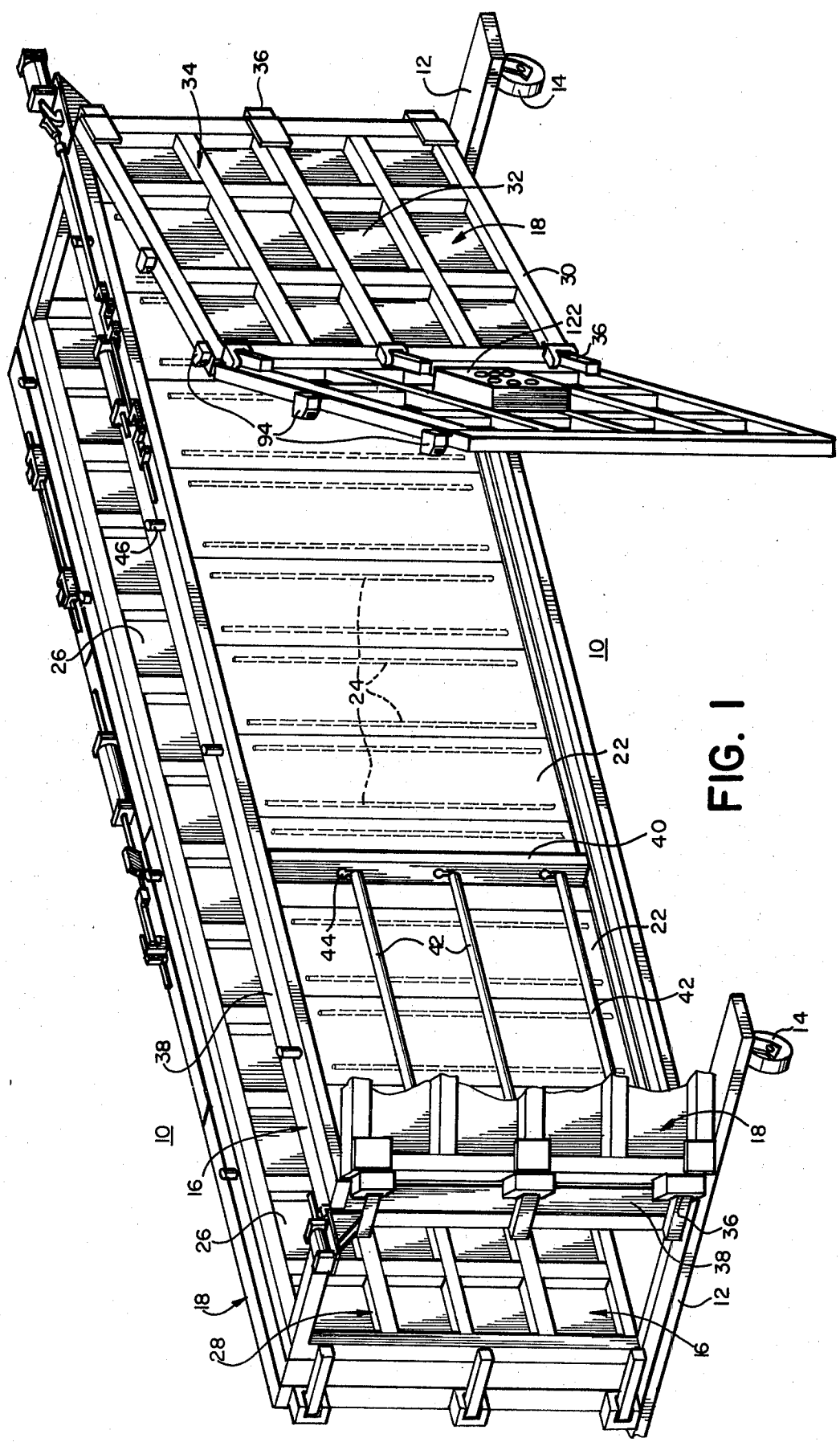
FIG. 1 is a perspective view of a molding apparatus according to this invention, with access doors partially open and partially cut away.

This invention provides an apparatus for molding clad or laminated, foam body panels in various sizes and shapes. In various embodiments as will be described herein, such panels may be used to build, for example, a prefabricated walk-in refrigerated room.

In the largest of the embodiments, as shown in FIGS. 1-11, panels as high as approximately 4 feet and as long as approximately 12½ feet can be produced, as well as a plurality of smaller sizes.

Two molding apparatus 10 are mounted on a common chassis 12, which is provided with a set of wheels 14. The apparatus 10 are substantially identical, and are mounted together for purposes of convenience in operation. Each apparatus 10 is capable of independent operation or simultaneous operation for similarly sized and different sized panels. Due to scale factors in illustrating an apparatus of this size, certain aspects of the apparatus are either shown in diagrammatic form or are omitted for purposes of clarification in FIG. 1. All relevant details are fully disclosed in FIGS. 2-13, and will be described in detail in connection with those figures.

The molding apparatus 10 comprises first and second walls 16 and 18 respectively, defining a molding cavity 20 therebetween. The first wall 16 comprises a plurality of flat panels 22, each of which has heating means 24 in heat exchanging contact therewith. In the presently preferred embodiment, heating means 24 are electrical resistance heating elements embedded in flat panels 22 as shown in FIGS. 9 and 10. The panels 22 are preferrably formed from heat conductive material, such as aluminum. The backs of the flat panels are covered by thermal insulating members 26, in order to direct a maximum amount of heat into the molding cavity 20. In order to assume structural rigidity during molding, which is a pressurized process, first wall 16 further comprises a grid of reinforcing members 28. The second wall 18 comprises a number of access doors 30. Each access door 30 comprises a flat panel 32 and a grid of reinforcing members 34. Each door is also provided with a heating panel 22, backed by an insulating panel 26. Depending upon the size of the molding apparatus, the molding apparatus will normally have either two or four access doors 30. The access doors 30 are mounted to the apparatus 10, and where necessary, to another access door, by means of hinges 36.

Figure 8:
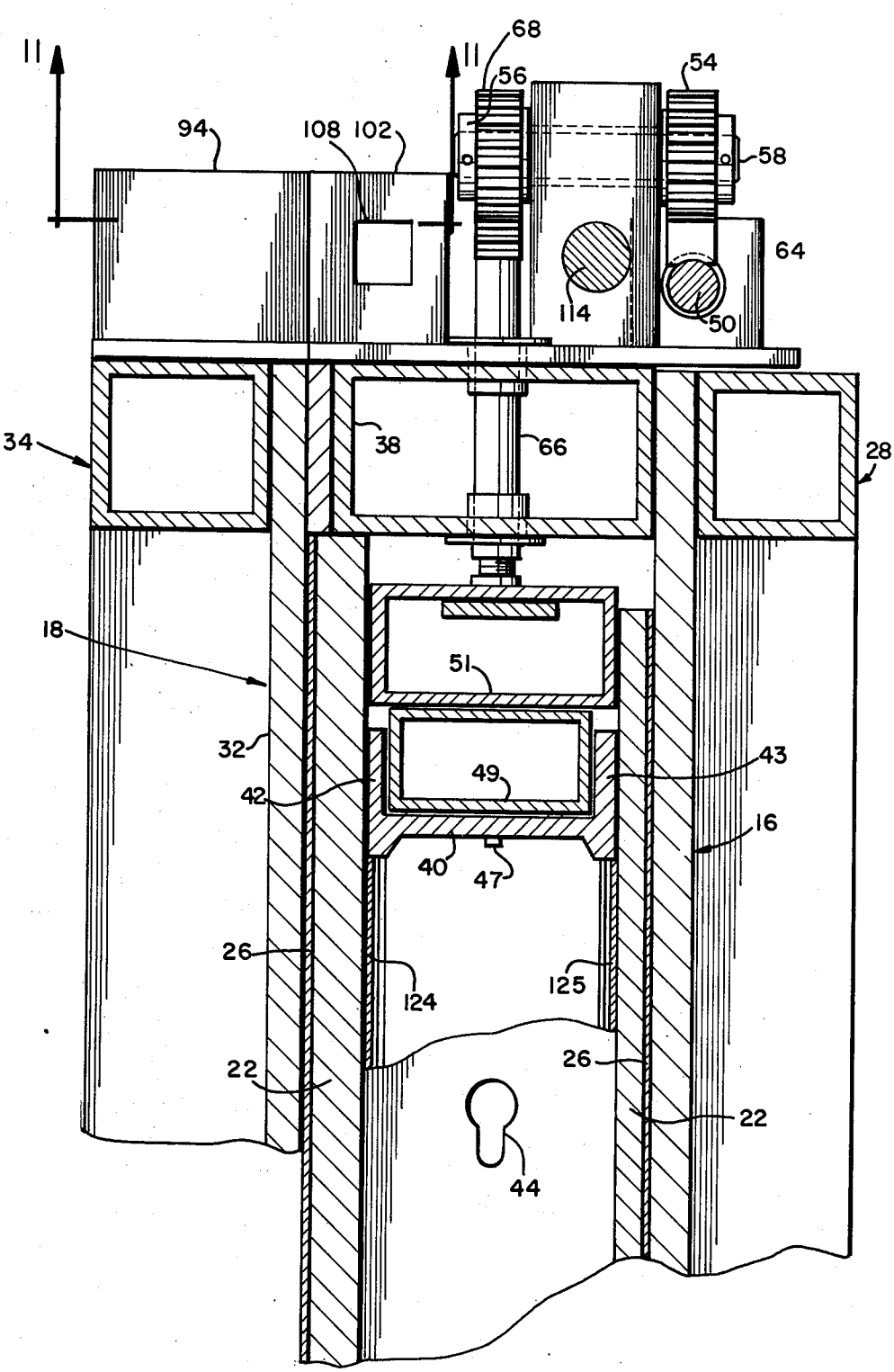
FIG. 8 is a partial section view taken along the line 8—8 in FIG. 5.
Figure 11:
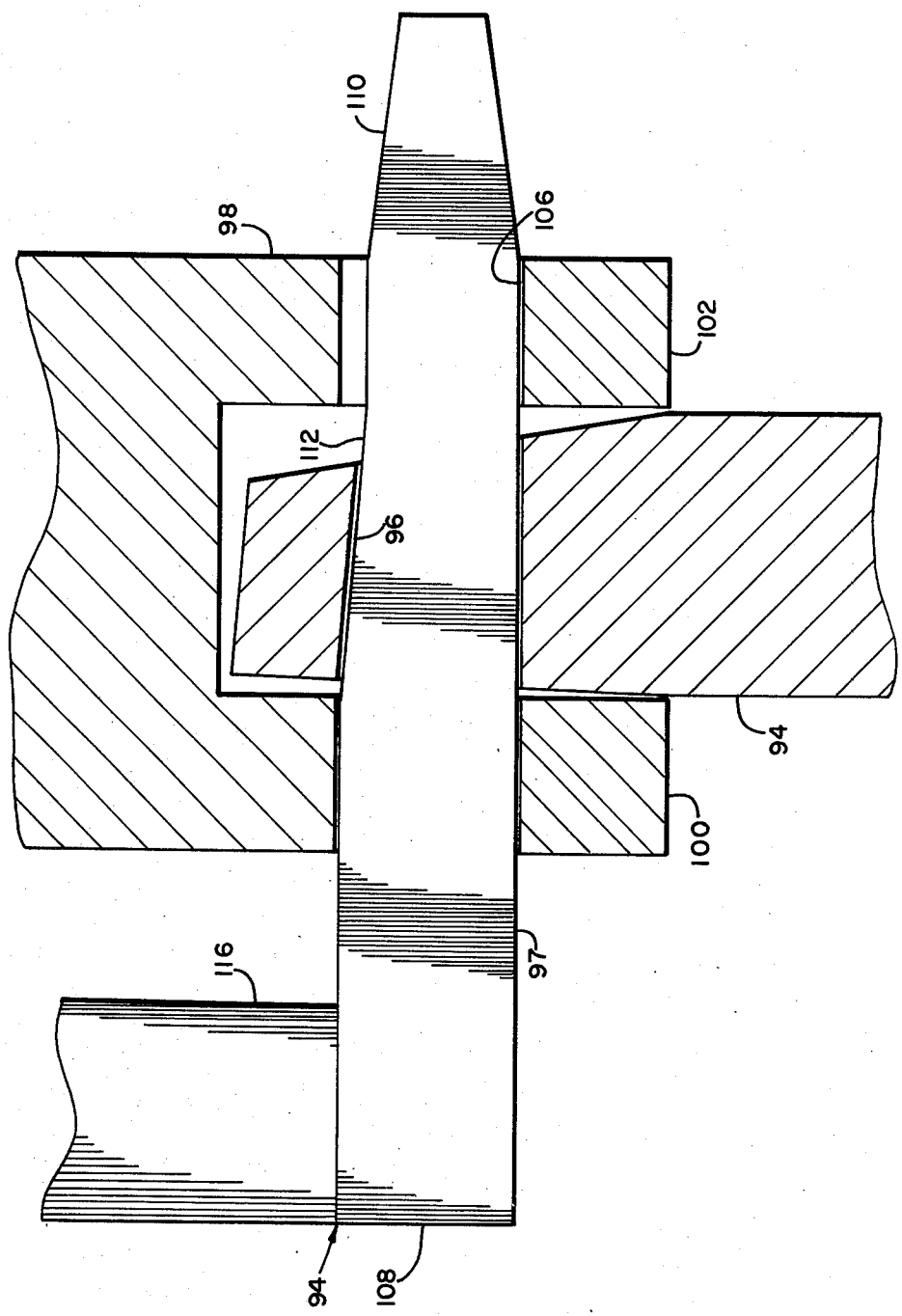
FIG. 11 is a section view taken along the line 11—11 in FIG. 8, in enlarged scale.

The narrow sides or edges of molding apparatus 10 are defined by four side or edge members 38. The sides or edges of the molding cavity 20, however, are defined by four holding and shaping members 40 positioned perpendicularly adjacent to each other, only one of which is shown in FIG. 1 for purposes of clarification. One holding and shaping member 40 is provided for engaging each side or edge of the panel to be molded, as indicated in FIG. 8. The overall size of the effective molding cavity 20, and the panel to be molded, is determined by insertion of adjustment rods 42 which engage and releasably interlock with holding and shaping members 40 and side or edge members 38 by means of key slots 44 and corresponding structure on the ends of each adjustment rod 42. A number of filler pipes 46 are mounted through upper edge 38, for filling or injecting foam material into the molding cavity. Each filler pipe 46 is provided with a removable plug 49, as shown more fully in FIG. 6. Plugs 49 are provided with disengageable locking means 51, such as the quick release bayonet arrangement shown in FIG. 6. Whether or not a particular filler pipe 46 will be utilized depends upon the size of the panel to be molded.

The panels for which this invention is particularly adapted are laminated panels, having a foam body and being clad by, for example, aluminum or stainless steel sheets. Accordingly, it is necessary to properly locate the cladding sheets within the molding cavity prior to molding, and to lock them securely therein.

Figure 4:
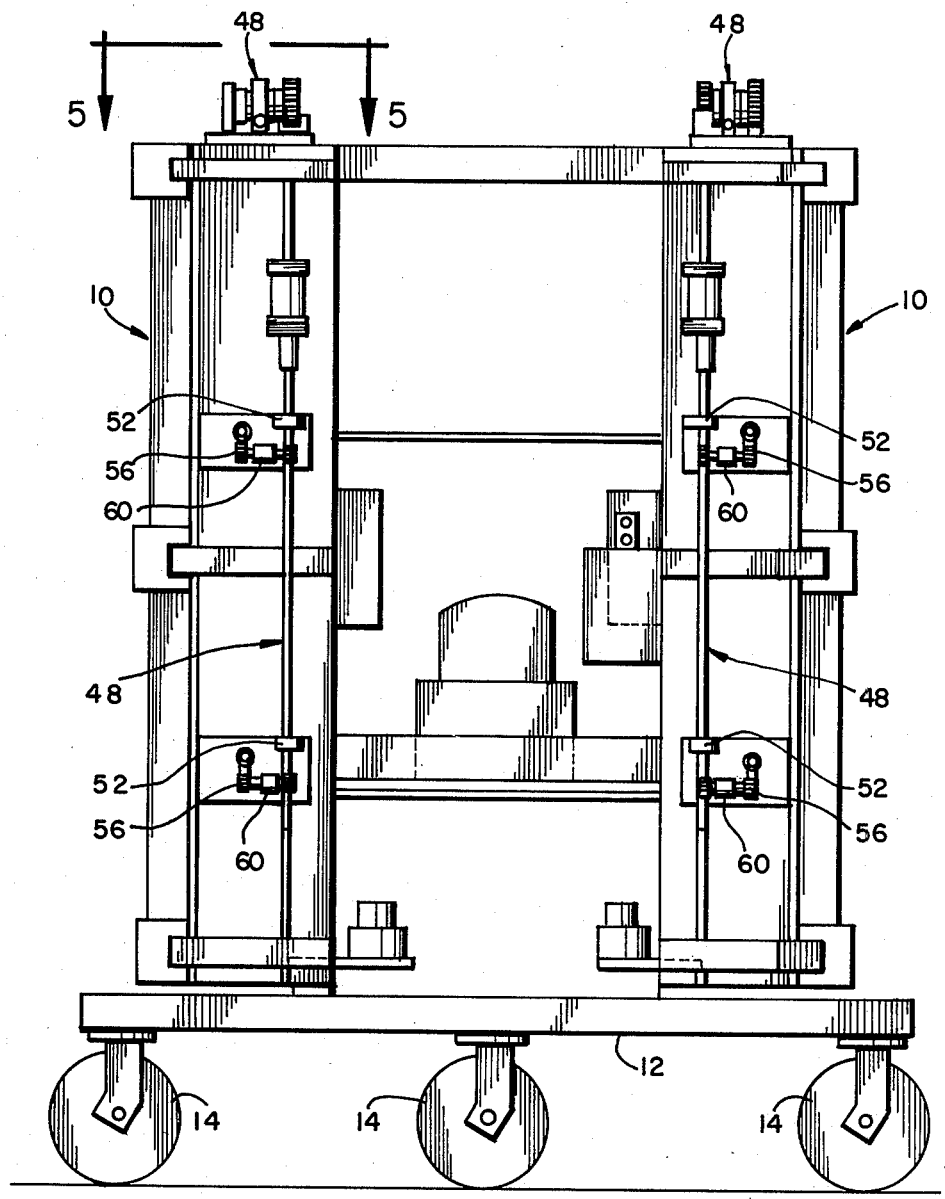
FIG. 4 is a section view taken along the line 4—4 of FIG. 2.

Further, notwithstanding the size adjustment provided by the use of different sized adjustment rods 42, it is necessary to have a finer movement which can positively lock or engage the cladding sheets. Accordingly, at least two perpendicularly adjacent sides or edges of the molding cavity are provided with holding and shaping means 40 which are not mounted only by adjustment rods 42, but are held and positioned by a novel locking means arrangement towards and away from the center of cavity 20. In the illustrated embodiment, and with respect to the orientation of FIGS. 1 and 2, adjustment rods 42 are used to mount holding and shaping means 40 to form the left side and bottom side of the molding cavity 20. The right and left hand and top sides of the molding cavity are formed by holding and shaping means 40 operably connected to a first movable locking means 48, the left hand side utilizing both adjustment rods 42 and first locking means 48. Holding and shaping means 40 are connected directly, by mounting block 49, or indirectly by mounting block 51, as shown in FIG. 8. First locking means 48 comprises at least one system, and in most cases a plurality of systems which are independently operable, but are preferrably simultaneously controllable. Four such systems comprising the first locking means are shown in FIGS. 2 and 4. The details of the first movable locking means are best illustrated in FIGS. 5-7 and 9.

The first locking means 48 comprises a first locking bar member 50 which is slidably mounted through bores and bearings in a plurality of journal blocks 52. A pair of pinion gears 54 and 56 are rotatably mounted in each of second journal blocks 60, and are fixed together for rotation on a common shaft 58, as also shown in FIG. 8. First journal blocks 52 and second journal blocks 60 are mounted in pairs on base plates 62.

In order to assure ease of movement of locking bar member 50 through journal blocks 52, bores 53 are of a larger diameter than locking bar member 50, and alignment of locking bar member 50 is accomplished by means of a more closely fitting bearing guide plate 55 secured to one side of the journal blocks 52, as shown in FIGS. 6 and 7.

First locking bar member 50 is provided with a plurality of rack gears 64, each of which is drivably engaged with a pinion gear 54. It should be noted that the movement of locking bar 50 in the sense of FIG. 5, is the same as that of FIG. 6, however, that movement is in the opposite direction in the sense of FIG. 7, i.e., when locking bar member 50 moves to the right, with respect to FIG. 6, locking bar member 50 moves to the left as shown in FIG. 7, and vise versa. For each pinion gear 58 there is a connection member 66. Each connection member 66 is provided with a rack gear 68 which is drivably engaged with each pinion gear 56. Accordingly, as locking bar member is moved to the left, in FIG. 5, equivalent to locking bar member moving to the right in FIG. 7, pinion gear 54 rotates counter clockwise in FIG. 7 and clockwise in FIG. 6. As pinion gear 56 rotates clockwise, as shown in FIG. 6, rack gear 68 and connection member 66 are driven downwardly, in the sense of FIGS. 6 and 9. When locking bar member 50 is moved in the opposite direction (to the right in FIG. 5), connection member 66 is raised, in the sense of FIGS. 6 and 9. Of course, where first locking means 48 are disposed on sides of the apparatus, connection members 66 will move in and out, rather than necessarily up and down. With reference to FIG. 9, connection member 66 extends through a sidewall 38 of apparatus 10, through bearings 67 and is attached to a holding and shaping member 40 by suitable attachment means 70. In the presently preferred embodiment, at least two of the holding and shaping members 40 are movably supported by a plurality of connection members 66, driven by a corresponding number of rack and pinion gear arrangements. Where necessary the holding and shaping members which are attached to the rack and pinion assemblies are provided with a bore 72, so that such holding and shaping members can slidably overfit filler pipes 46.

Each locking bar member 50 is driven by a driving means 74, such as a hydraulic cylinder, which is connected to locking bar member 50 by an over-center locking toggle assembly 76 and a reverse linkage assembly 78. Hydraulic driving means 74 is pivotally mounted in yoke 80. The reversing link 82 of reverse linkage assembly 78 is pivotally mounted in yoke 84. The over-center locking toggle assembly 76 is supported between the end of the operating piston 86 of drive means 74 and one end of reversing link 82. Over-center toggle locking assembly 76 compriss toggle links 88 and 90.

FIG. 9 illustrates an unlocked position. When hydraulic drive means 74 is actuated, the drive means will rotate clockwise in yoke 80, causing toggle link 88 to be rotated clockwise and pulled to the right, which in turn pulls toggle link 90 to the right. With reference to FIG. 5, as toggle link 90 is pulled to the right, or toward the drive means 74, reversing link 82 will be rotated counterclockwise, thereby driving first locking bar member 50 to the left. As locking bar member is driven to the left, as shown in FIGS. 5 and 9, pinion gears 56 and 58 are caused to rotate clockwise, as shown in FIG. 9, thereby causing connection members 66 to be driven downwardly, from the position shown in FIG. 9 to the position shown in FIG. 6. When drive means 74 reaches the limit of its movement, the over-center toggle assembly 76 will have locked locking bar member 50 into the closed position, wherein the molding can take place. When drive means 74 is deactuated, it rotates counter clockwise, with respect to FIG. 9, first unlocking the over-center toggle locking assembly and then driving locking bar member 50 to the right, moving connection member 66 from the position shown in FIG. 6 to the position shown in FIG. 9.

In the "four door model" of this invention, as illustrated in FIG. 2, first locking means 48 are provided for not only the upper holding and shaping member and the right hand holding and shaping member, but the left hand holding and shaping member as well. The upper holding and shaping member is in fact supported by two first locking means.

The "two door model", is similar in all respects to the "four door model" except that it is smaller, and has only two doors. Although scale factors prevent full details from being shown in FIG. 1, it may be appreciated that adjustment rods 42 may be formed so that one end thereof will releasably interlock with the end of connection member 66, providing in effect what is a rough adjustment and a very fine adjustment in size.

Another significant factor in a molding apparatus of such large size as disclosed herein, is maintaining the integrity of the walls defining the molding cavity, in spite of the pressure which is developed in the molding cavity during molding. Flat panels 22 of first wall 16 are permanently attached, and in conjunction with reinforcing grid 28 provides a basically rigid surface. The problem is significantly more difficult for second wall 18, as it comprises a number of hingeably mounted access doors 30. Accordingly, there are provided a number of second locking means 92 for securing the access doors, which operate independently of the first locking means, but which can be controlled simultaneously therewith.

The details of the second locking means 92 may be best appreciated by reference to FIGS. 2, 3, 5, and 11. Each access door is provided with a plurality of locking blocks 94, some of which are also shown in FIG. 1. Locking blocks 94 are provided with bores having at least one inclined locking surface 96. When access panel doors 30 are closed, locking blocks 94 are each disposed in the opening of a plurality of yoke blocks 98, each having two yoke arms 100 and 102, and each provided with a bore having locking surfaces 104 and 106 respectively, which are located in positions corresponding to the flat locking surface 97 of locking block 94. A locking wedge 108 is slidably insertable through the bores of the yoke block arms and locking block, each locking wedge 108 having double inclined locking surfaces 110 and 112. The locking wedges 108 are mounted to a plurality of second locking bars 114, the wedges being secured to the second locking bars 114 by mounting blocks 116. Each of the second locking bars 114 is operated by driving means 118, such as the hydraulic piston assembly shown, the drive means 118 being connected to the second locking bar 114 by a drive block 120. The double inclined locking surface arrangement of wedge 108, shown more fully in FIG. 11, assures that a minimum amount of driving power will be necessary to firmly lock the access doors into place, and after molding, to release the doors notwithstanding the high pressures within the molding cavity developed during the course of molding. The locking is a two step process, wherein locking surface 96 is first engaged by locking surface 110 and then by locking surface 112. Molding pressures tend to force the access doors and the locking blocks attached thereto outwardly, increasing the difficulty of disengaging the locking arrangement.

Second locking means systems 92 are disposed on the top, sides and bottom of the molding apparatus 10, as well as along the abutting edges of the two center access doors, i.e. those access doors which are not otherwise connected to one another.

A control panel 122 is preferably mounted on one of the access doors 30 as shown in FIGS. 1 and 2. The control panel preferably contains push-button controls for activating and disengaging the first and second locking means and for energizing the heating means and controlling the duration of heating. As shown in FIG. 4, there is a space between the two molding apparatus 10 which can be utilized to mount the various pumps and electrical connections necessary to power and activate the hydraulic and electric systems. Such devices are known in the art, and are merely indicated diagrammatically in the figure. The electrical heating means are provided with thermostatic temperature regulators and timing means for pre-heating and heating the mold. The hydraulic drive means are provided with hydraulic pressurizing means and pressure monitoring means. Although the hydraulic lines for each of the hydraulic driving members have been omitted in most cases from the drawings, for purposes of clarification, it will be appreciated that each hydraulic means is in fact connected to the hydraulic pressurizing means in the conventional fashion.

The shape of the holding and shaping members 40 is shown in FIG. 8. The particular surface configuration 41 will of course depend upon the desired shape of the molded object. In the instance where the panels are to be fitted together, for instance, in side by side relationship, one side shape will be convex in one fashion or another and the other side will be concave in a corresponding shape. Irrespective of the shape, it is important that the sides 43 of the holding and shaping member 40 are constructed in close tolerance with the innermost surfaces of first and second walls 16 and 18, when the apparatus is in a locked or operable position.

Figure 12A:
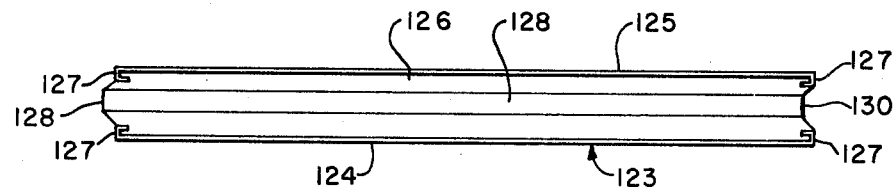
FIGS. 12(a) and 12(b) are top elevations of panels according of this invention, shown in diagrammatic form; and, FIG. 13 is a molding apparatus in accordance with this invention, for molding corner panels, shown in diagrammatic form.
Figure 12B:
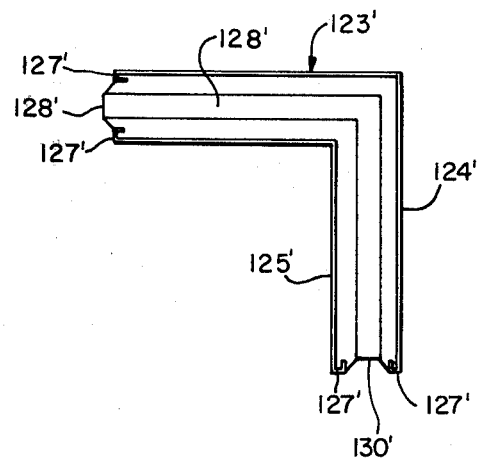

The cladding for a typical flat panel 123 is shown in FIG. 12(a). A front sheet 124 and rear sheet 125 have a layer of foam 126 sandwiched therebetween. Front and rear sheets have lips or flanges 127 which are turned back into the foam, in order to assure a strong bond. The holding and shaping means form tongue 128 and groove 130 shapes on opposite sides respectively, as well as the top and bottom. The tongue and groove shapes ease modular construction of the panels. Corner panels, similar in all respects except shape, shown in FIG. 12(b) can be molded on apparatus such as that shown in FIG. 13.

The molding apparatus, in contrast to the clumsy arrangements of the prior art, is simple to operate. The access doors are opened as wide as possible, and the first locking means are placed in an open or unlocked position. Then, the proper adjustment rods are inserted in order to place the holding and shaping members in the proper position for the size of panel desired. The cladding 122 is then placed in the molding cavity, resting on or against at least two of the holding and shaping members. The access doors are then closed, and the second locking means is actuated, firmly securing the doors and forming the second wall 18. The first locking means are then actuated, moving the remaning holding and shaping members inwardly, engaging the remaining sides or edges of the cladding 122. Next, the mold is pre-heated. After pre-heating, at least one of the filler pipes 46 is opened, by removing cap 49, and the molding cavity, now defined by the cladding member 122, the inner surfaces of the first and second walls and the holding and shaping members, is filled with foam material, such as polyurethane, until the molding cavity is filled. The electrical heating means are then activated, and maintained in that fashion until the foam has cured and hardened. After the foam has had sufficient time to cure, the electrical heating means are deactivated, the first and second locking means are disengaged, the access doors are opened, and the completed panel is removed. Of course, it may be necessary to trim what are normally negligible amounts of excess foam material.

Apparatus according to this invention can be used to form other than flat panels. For example, the corner panels shown in FIG. 12(b) can be formed on the apparatus 200 diagrammatically illustrated in FIG. 13. The apparatus 200 has two molding fixtures 202 mounted on a common chassis 204. Each fixture comprises a fixed, right angle molding wall 206 and a right angle molding door 208. The molding walls 206 and doors 208 comprise insulated heating panels, not shown, corresponding to panels 22 and 26 as shown in FIG. 8. Each door is secured by hinges 210 at one end and locking assemblies 212 at the other end. The locking assemblies may be similar to second locking means 92.

The doors 208 are controlled by a hydraulic piston cylinder assembly 214, pivotally connected to each door 208 by struts 216. The piston assembly can be used to open or close either of the fixtures, depending upon which fixture is locked. Holding and shaping means are also utilized, although only two will be movable by a means similar to first locking means 48.

The present invention may be embodied in other specific forms without departing from spirit or essential attributes thereof, and accordingly, reference should be made to the appended claims, rather than to the foregoing specification as indicating the scope of the invention.

I claim:

1. An apparatus for molding laminated, foam-body panels comprising:
   first and second walls, said first wall including means for heating said foam during molding and said second wall comprising access doors;
   a first set of at least two adjustable holding and shaping means adapted to engage and form at least two edges of said panels, and disposed angularly adjacent to each other;
   a second set of holding and shaping means adapted to engage and form all remaining edges of said panels and disposed angularly adjacent to each other, said first and second walls and said first and second sets of holding and shaping means defining a molding cavity therebetween;
   means for simultaneously positioning said first set of adjustable holding and shaping means;
   first movable locking means for said first set of holding and shaping means;
   second movable locking means for holding said access doors closed flat;
   means for actuating and disengaging said first and second locking means, said first locking means being automatically actuated in response to said positioning means; and,
   means for filling said cavity with unmolded foam material.

2. The apparatus of claim 1, wherein each of said holding and shaping means in said first set is movable by a rack and pinion assembly.

3. The apparatus of claims 1 or 2, wherein said second locking means comprises a plurality of movable wedges, each having a double inclined locking surface.

4. The apparatus of claim 3, wherein said actuating and disengaging means comprises at least one first locking bar member, having a plurality of racks, and pinions driven thereby, each of said locking bar member pinions being fast with one of said pinions of said first locking means, and at least one second locking bar member, each of said wedges being fast with said second locking bar member whereby movement of the locking bar members actuates and disengages said first and second locking means.

5. The apparatus of claim 4, further comprising a plurality of said first and second locking bar members.

6. The apparatus of claim 5, wherein said first and second locking bar members are independently operable.

7. The apparatus of claim 4, further comprising hydraulic drive means for each of said first and second locking bar members.

8. The apparatus of claim 7, further comprising an off-center-toggle assembly for coupling each of said first locking bar members to its respective drive means.

9. The apparatus of claim 1, wherein said heating means comprises a plurality of electrical heating elements embedded in said first wall.

10. The apparatus of claim 1, wherein the filling means comprises a plurality of filler pipes extending through the top of the cavity, each of said pipes having a removable cap.

11. The apparatus of claim 7, further comprising means for simultaneously controlling said drive means.

12. The apparatus of claim 1, wherein at least one of said holding and shaping means in said second set is also automatically adjustable by said positioning means.

13. The apparatus of claim 1, wherein said positioning means moves said holding and shaping means towards and away from the center of said cavity.

14. The apparatus of claim 1, wherein the at least two holding and shaping means of said first set are perpendicularly adjacent to each other.

15. The apparatus of claim 1, wherein the heating means for the foam are electrical.

* * * * *